(12) United States Patent
de Barros et al.

(10) Patent No.: US 6,447,388 B1
(45) Date of Patent: Sep. 10, 2002

(54) AIR CONDITIONER AIR DIRECTING APPARATUS

(75) Inventors: Daniel Alessandro Oliveira de Barros, Novo Hamburgo; Paulo Augusto Lisboa Ramos, Esteio; Andrei Tres, Canoas, all of (BR)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/554,050
(22) PCT Filed: Sep. 16, 1998
(86) PCT No.: PCT/BR98/00071
§ 371 (c)(1),
(2), (4) Date: May 9, 2000
(87) PCT Pub. No.: WO00/16020
PCT Pub. Date: Mar. 23, 2000

(51) Int. Cl.[7] .................................. F24F 7/013
(52) U.S. Cl. .................. 454/202; 454/155; 454/316
(58) Field of Search ................. 454/202, 305, 454/313, 315, 316, 319, 321, 152, 155, 286

(56) References Cited

U.S. PATENT DOCUMENTS

| 5,538,470 A | 7/1996 | Norbury et al. | 454/152 |
| 5,573,458 A | 11/1996 | Chu | 454/315 |
| 5,947,813 A * | 9/1999 | Chow et al. | 454/155 |

FOREIGN PATENT DOCUMENTS

| DE | 3306273 | 5/1984 |
| GB | 2081883 | 2/1982 |

* cited by examiner

Primary Examiner—Jiping Lu

(57) ABSTRACT

An air conditioning unit discharge opening includes an inlet and outlet side and a pair of spaced walls. Each of the walls has a mounting pin formed thereon, which extends in a direction toward the other wall such that the mounting pins together define a longitudinal axis extending therebetween. An air discharge nozzle has an inlet side and an outlet side and a pair of spaced substantially planar walls. The nozzle is configured to be received within the air discharge opening with the planar walls of the nozzle in closely adjacent relationship with the planar walls of the discharge opening. Pin receiving conformations are formed on each of the planar walls of the nozzle. Each of the conformations includes an open ended slot extending into the wall from the inlet side and an arcuately shaped pin receiving socket formed at the inner end of the slot. The sockets are configured to receive the mounting pins therein in a snap-fit relationship and to allow pivotal movement of the air discharge nozzle about the longitudinal axis. In a preferred embodiment, one of the side walls defining the air discharge opening includes an outwardly extending tooth-like protuberance adjacent the mounting pin. The wall of the discharge nozzle adjacent the wall carrying the pin is provided with an arcuate tooth engaging conformation, which is adapted to releasably engage the tooth to allow movement of the air discharge nozzle upon imparting an external rotational force thereupon and yet holding the air discharge nozzle at a desired position upon release of the external force.

3 Claims, 5 Drawing Sheets

AIR CONDITIONER AIR DIRECTING APPARATUS

TECHNICAL FIELD

This invention relates generally to air conditioning apparatus and, more particular, it relates to apparatus for mounting and positioning the means for directing air from an air conditioning unit.

BACKGROUND ART

Air conditioning units are frequently employed to condition the air within a single residential room or confined space and are widely referred to as "room air conditioners". Conventionally, such room air conditioners include a housing, which is mountable within an opening into a room, air conditioning means mounted within the housing, and blower means mounted within the housing for drawing air from the room into the housing through the air conditioning means for conditioning and thereby returning the thus conditioned air to the room.

Usually, only one such air conditioner is mounted in each room, with its conditioned air discharge opening positioned in the interior wall of the room to be served by the air conditioner. Because the location of the air conditioner unit is frequently dependent upon the location of available window space in the room, it is often impossible to position the unit in a location which will produce optimum distribution of the conditioned air that is discharged from it. It is well known in the art to provide the air discharge mechanisms for such units with moveable louvers which themselves are mounted in moveable louver frames. Such arrangements allow for positioning of the louvers and the louver frame to direct air to the right or left or upwardly or downwardly as desired.

The mounting for such moveable louvers and movable louver frames typically include mounting pins or the like received in openings which facilitate pivotal movement of the desired component. Such flexibility has allowed for fairly good directional control of the conditioned discharge air. It has been found, however, that in certain air conditioning units, at higher fan speeds, and those which generally have higher air flow, that the desired setting of such louvers and louver frames quite often are defeated by the flow of air acting on the louvers and the frames in an aerodynamic manner to thereby straighten out the air directing components to align them with the direction of the air flow. It is not unusual to see such air conditioning units having pieces of folded cardboard or paper wedged into the region surrounding the air directing components in order to attempt to keep them in a position which will direct air in a desired direction. It is accordingly desirable to provide an air directing apparatus, which may be readily adjusted and which will stay in the desired adjusted position with the unit subject to high volume/velocity air flow.

DISCLOSURE OF THE INVENTION

According to the present invention, an air conditioning unit is provided with means for defining an air discharge opening from the unit. The discharge means includes an inlet and outlet side and includes a pair of spaced apart planar walls. Each of the walls has a mounting pin formed thereon, which extends in a direction toward the other of the pair of walls such that the mounting pins together define a longitudinal axis extending therebetween. An air discharge nozzle has an inlet side and an outlet side and a pair of spaced apart substantially planar walls. The nozzle is configured to be received within the air discharge opening of the unit with the planar walls of the nozzle in closely adjacent relationship with the planar walls of the air discharge opening. Pin receiving conformations are formed on each of the planar walls of the nozzle. Each of the conformations includes an open ended slot extending into the wall from the inlet side thereof and an arcuately shaped pin receiving socket formed at the inner end of the slot. The sockets are configured to receive the mounting pins therein in a snap-fit relationship and to allow pivotal movement of the air discharge nozzle about the longitudinal axis. In a preferred embodiment, one of the side walls defining the air discharge opening includes an outwardly extending tooth-like protuberance adjacent the mounting pin and near the outlet side of the opening. The wall of the air discharge nozzle adjacent the wall carrying the pin is provided with an arcuate tooth engaging conformation thereon, which is adapted to releasably engage the tooth to allow movement of the air discharge nozzle upon imparting an external rotational force thereupon and yet holding the air discharge nozzle at a desired position upon release of the external force.

BRIEF DESCRIPTION OF THE DRAWINGS

The invention may be better understood and its objects and advantages will become apparent to those skilled in the art by reference to the accompanying drawings, in which.

BEST MODE FOR CARRYING OUT THE INVENTION AND INDUSTRIAL APPLICABILITY

Figure 1:
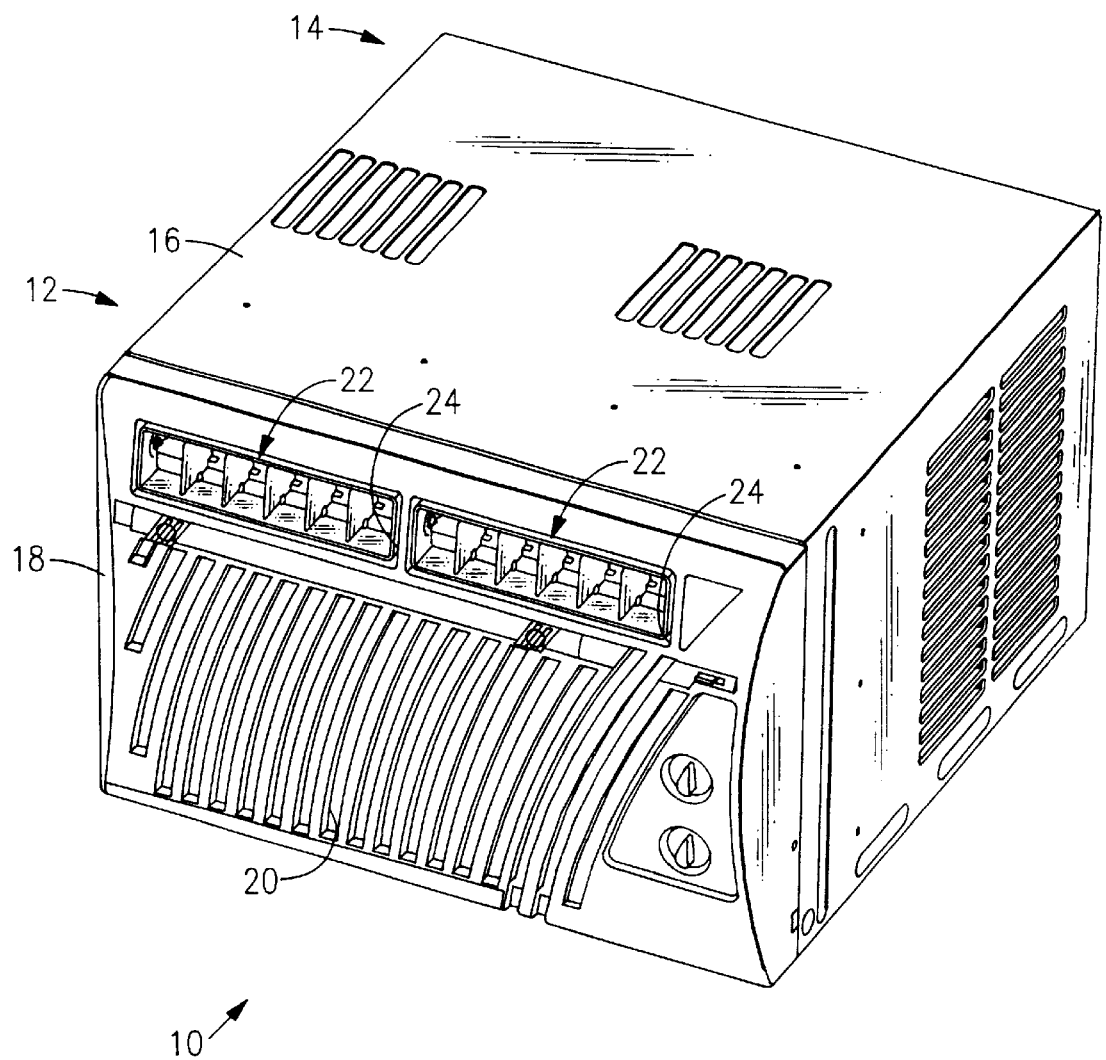
FIG. 1 is a perspective view of an air conditioning unit embodying the present invention.

FIG. 1 illustrates a window air conditioner unit 10, which includes generally, an indoor section 12 and an outdoor section 14. The air conditioner is enclosed in a substantially rectangular housing 16 and is adapted to be positioned in a rectangular opening in an exterior wall or in a window in a room where cooling is desired, with the indoor section 12 facing into the room, as is conventional.

The indoor section 12 includes an indoor grille 18, which includes inlet louvers 20 and a pair of air discharge assemblies 22 mounted in a pair of air discharge openings 24. During operation of the air conditioner, air from the space to be conditioned is drawn by action of an evaporator fan (not shown) through the inlet louvers 20 and is directed through an evaporator coil (not shown) where the air is cooled. The cooled air is then directed back into the room to be cooled through the air discharge openings 24 and air discharge assemblies 22. Each of the air discharge openings 24 and the air discharge assemblies 22 mounted therein are identical and, accordingly, only one will be described in detail.

Figure 5:
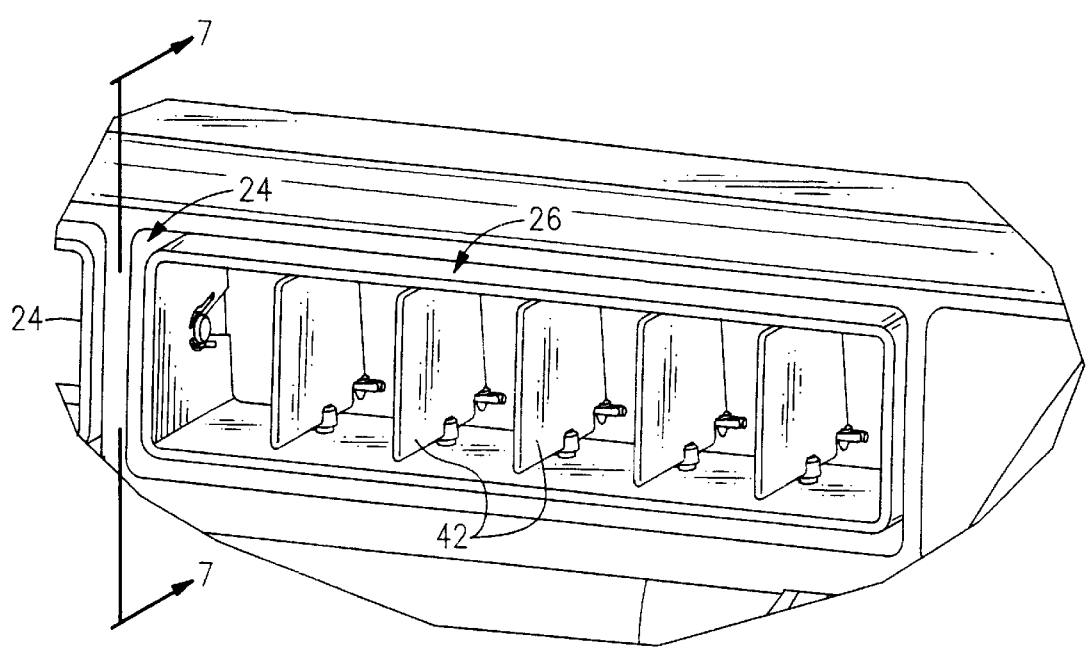
FIG. 5 is an enlarged view of the region identified as FIG. 5 in FIG. 4.
Figure 8:
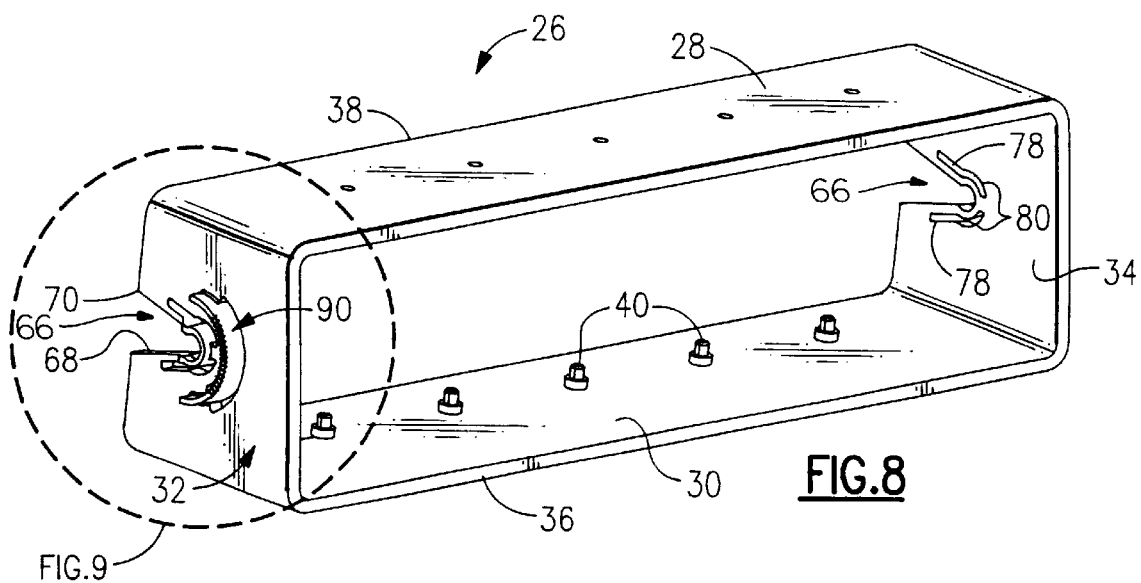
FIG. 8 is an enlarged perspective view of the air discharge nozzle of the present invention.

Each of the air discharge assemblies 22 includes a substantially rectangular shaped air discharge nozzle 26 defined by spaced apart horizontally extending top and bottom walls 28 and 30, respectively. Vertically extending left-hand side wall 32 and right-hand side wall 34 interconnect the opposite ends of the top and bottom walls to thereby define the rectangular nozzle. The nozzle 26 has forwardly facing edges 36 defining an outlet side and rearwardly facing edges 38 defining an inlet side. As is best seen in FIGS. 5 and 8, the top and bottom walls 28 and 30 are provided with mounting structure 40 thereon, which is adapted to support a plurality of vertically extending louvers 42 in a manner which will allow the louvers to pivot within the nozzle 26. The louvers and their mounting form no part of the present invention and, accordingly, are omitted from some of the drawing figures and will not be described in detail herein.

Figure 2:
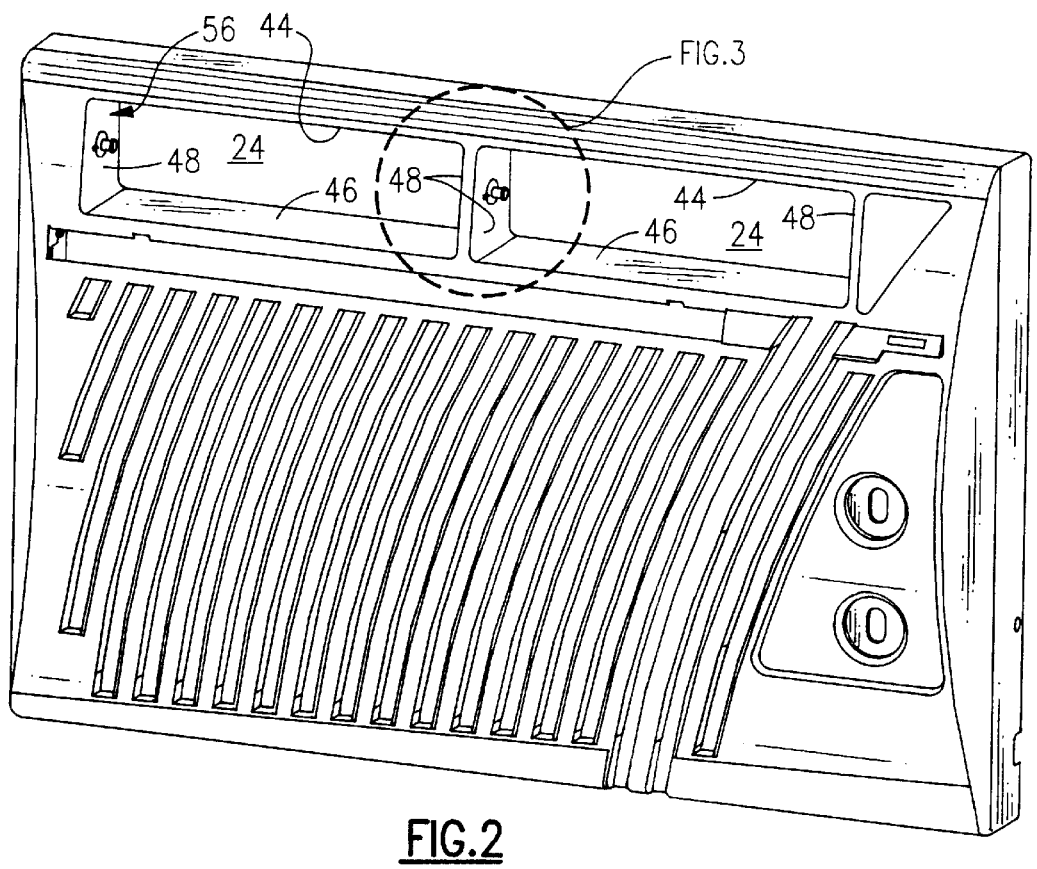
FIG. 2 is a perspective view of the front grille of the air conditioning unit of FIG. 1 with certain components removed therefrom to show details of the invention.
Figure 7:
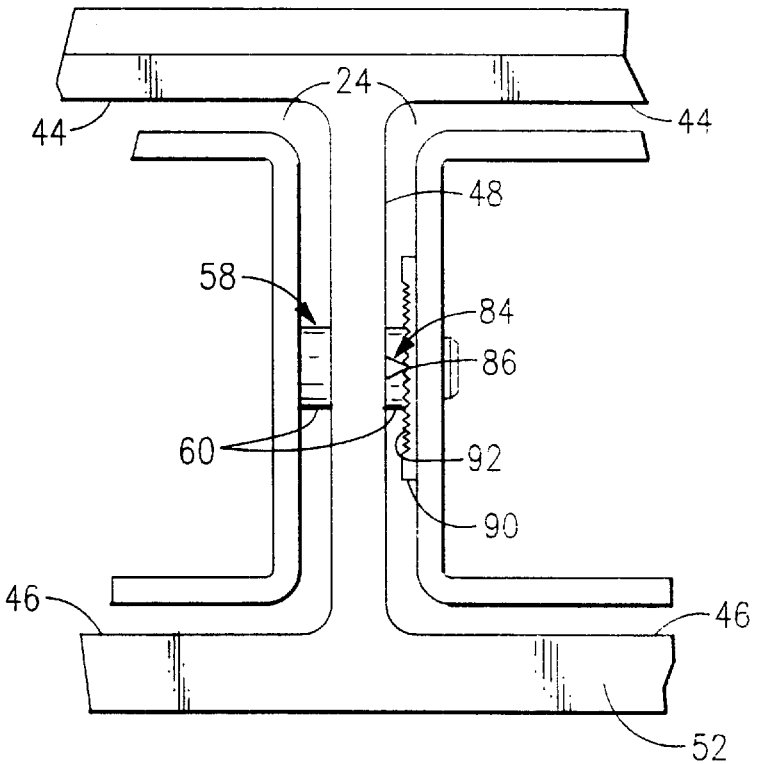
FIG. 7 is a view taken along the line 7—7 of FIG. 5.

As best seen in FIG. 2, each of the air discharge openings 24 in the grille 18 is substantially rectangular in shape and includes a top wall 44, a bottom wall 46 and left and right side walls 48 and 50, respectively. As with the air discharge nozzle 26, the openings 24 have an outlet defining front edge 52 and an inlet defining rear edge 54. As is evident, the shape of the air discharge opening 24 is substantially the same but slightly smaller than that of the air discharge nozzle 26. As a result, with the nozzle 26 mounted within the opening 24, as will be described in detail below in connection with the present invention, there is sufficient clearance between the top and bottom of the nozzle and the top and bottom of the opening, as seen in FIG. 7 to facilitate pivotal movement of the nozzle about a horizontal axis to facilitate a range of upward horizontal and downwardly directed air flow, as directed by the nozzle.

Figure 3:
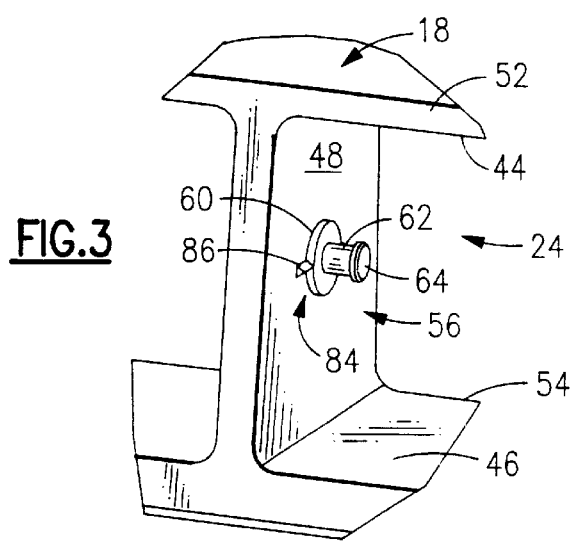
FIG. 3 is an enlarged view of the region identified as FIG. 3 in FIG. 2.
Figure 4:
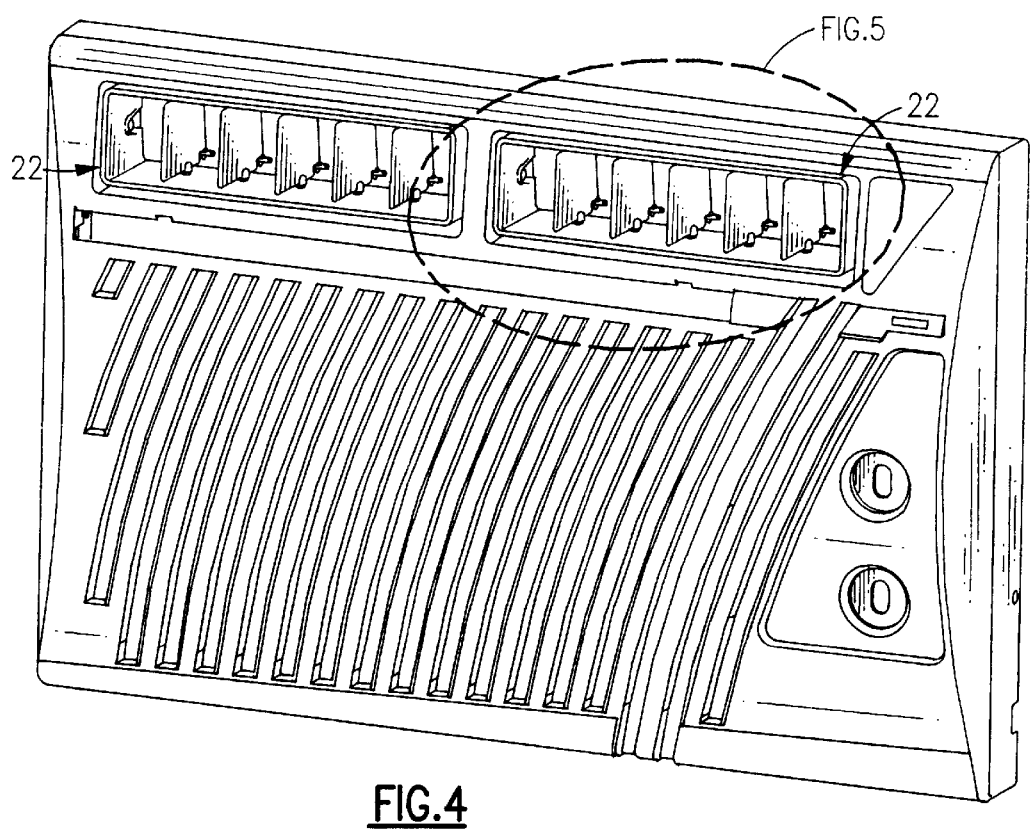
FIG. 4 is a view similar to FIG. 2 with the air directing apparatus mounted to the front grille.

Looking now at FIGS. 2 and 3, each of the side walls 48 and 50 of the air discharge opening are provided with outwardly extending pivot pins 56 and 58, respectively. As best seen in FIG. 3, the pins are integrally molded into their respective side walls and include a circular base section 60 extending a small distance from the side wall, a smaller diameter elongated cylindrical mounting section 62, and an intermediate diameter retaining head 64 carried at the outer end of the mounting section 62.

Figure 9:
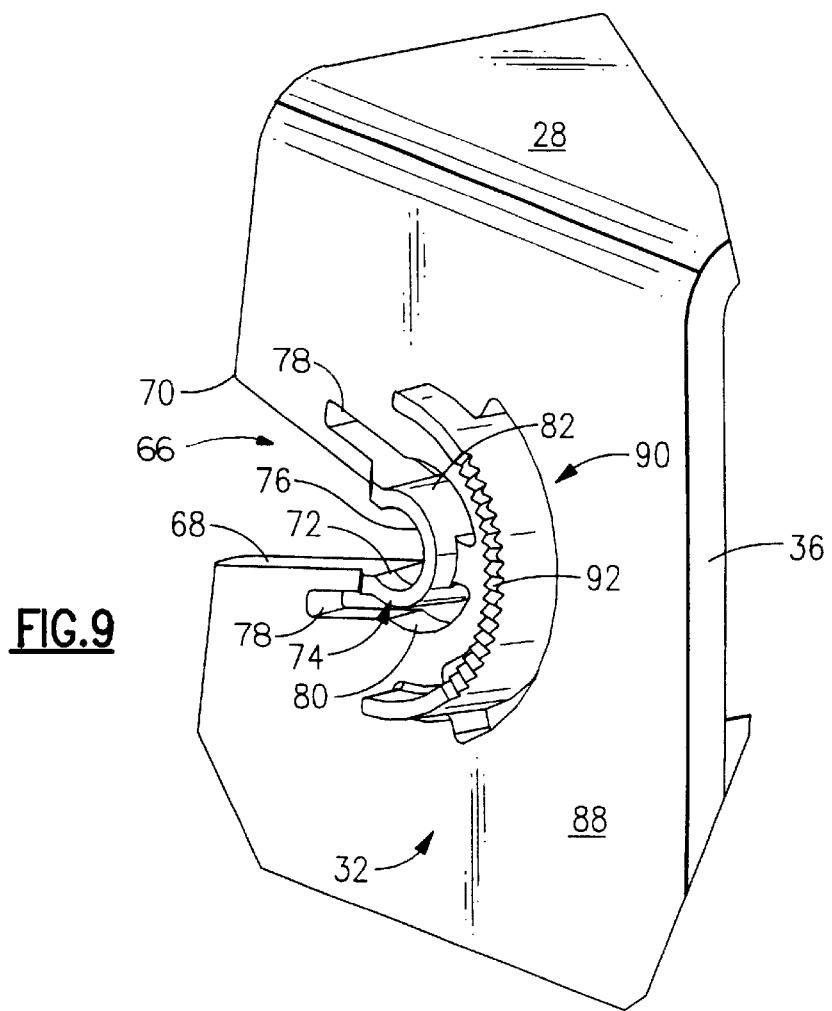
FIG. 9 is an enlarged view of the region identified as FIG. 9 in FIG. 8.

Each of the side walls 32 and 34 of the air discharge nozzle 26 are provided with a pin receiving conformation 66, which is best shown in FIGS. 8 and 9. Each of the conformations comprises a tapered slot 68, which extends from a wider dimension section 70 at the inlet edge 38 of the nozzle to a narrower dimensioned section 72, which transitions to an arcuate pin receiving socket 74. As best seen in FIG. 9, each of the sockets 74 defines an arcuate inner wall 76, which has a diameter substantially the same as the outer diameter of the mounting section 62 of the pins 56. The dimension defined by the narrow end 72 of the slot 68 as it makes the transition to the arcuate inner wall 76 has a dimension such that it is slightly less than the outer diameter of the mounting section 62 of the mounting pins.

Again, as best seen in FIGS. 8 and 9, each of the side walls 32, 34 is provided with a pair of internal through slots 78, which are closely spaced from and which extend parallel to the tapered slots 68 and which have an arcuate section 80, which extends around and defines the outer wall 82 of the pin receiving socket 74. The internal slots 78, as described above, allow the pin receiving socket 74 and the narrow end 72 of the tapered slot 68 to flex outwardly to allow the mounting pin 64 to pass through the section of smaller diameter 72 at the transition from the narrow end to the socket 74. Such flexing allows the pin to snap into the socket when the wall of the tapered slot and the socket are so deflected and to thereby return to an undeflected position upon passage of the pin into the socket. As thus assembled, the engagement of the socket and pins will allow pivotal motion of the nozzle about the horizontal axis defined by the pins 56 and 58.

Figure 6:
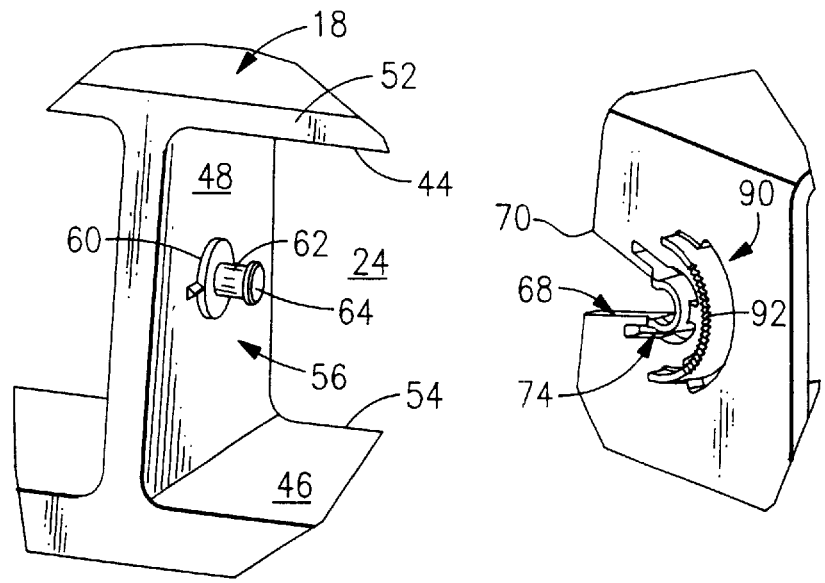
FIG. 6 is an exploded, fragmentary view of the details of mounting and positioning structure the air directing apparatus of the present invention.

Looking now at FIGS. 6 and 7, located forwardly of the mounting section 62 of the left-hand pivot pin 56 is a triangular tooth-like structure 84 which extends horizontally forwardly from the wall 48 and presenting a narrow tapered end 86 into the interior of the air discharge opening 24.

Carried on the outer surface 88 of the left-hand side wall 32 of the nozzle 26, forwardly of the pin receiving socket 74, is an arcuate conformation 90. The arcuate conformation 90 extends outwardly from the side wall 32 by a distance greater than the pin receiving socket 74 and is provided with a plurality of notches 92 facing outwardly from the end wall. As is best seen in FIGS. 6 and 7. the arcuate conformation 90 and the notches 92 carried thereby are positioned such that one of the notches 92 is engaged by the tapered end 86 of the tooth 84 when the nozzle 26 is mounted in the air discharge opening 24. as illustrated in FIG. 7. The dimension of the pin receiving socket 74, and the width of the pin retaining section 62 of the pivot pins, as defined by the base sections 60 and the retaining heads 64, is such that when the nozzle 26 is installed to the pins 56 and 58 there is no lateral movement of the nozzle assembly allowed. As a result, the tooth 84 and notch 92 engagement illustrated in FIG. 7 will be a positive engagement which cannot be overcome by the force of air passing through the nozzle and thus will hold the nozzle 26 in a selected position. The engagement, however, may be overcome by the operator of the air conditioning unit imparting a manual force on the nozzle, which will result in the tooth and notch engagement ratcheting to a different point of engagement therebetween. Upon release of the manual force, the nozzle will be again held in the new position. The arcuate conformation 90 extends through an arc which will allow the full range of motion of the nozzles 26 in the opening 24.

What is claimed is:

1. Apparatus for directing conditioned air from an air conditioning unit comprising:

means defining an air discharge opening from said unit, said means having an inlet and an outlet side and including a pair of spaced apart substantially planar walls, each of said walls having a mounting pin formed thereon which extends in a direction toward the other of said pair of walls, said mounting pins together defining a longitudinal axis extending therebetween;

an air discharge nozzle having an inlet side and an outlet side, said nozzle including a pair of spaced apart substantially planar walls, said nozzle being configured to be received within said air discharge opening with said planar walls of said nozzle in closely adjacent relationship with said planar walls of said opening;

pin receiving conformations formed on each of said planar walls of said nozzle, each of said conformations comprising an open ended slot extending into said wall from said inlet side thereof, and an arcuately shaped pin receiving socket formed at the inner end of said slot, each of said arcuately shaped pin receiving sockets further defining an arcuate inner wall having a diameter substantially the same as the outer diameter of said mounting pins, said sockets having a pin receiving opening contiguous with said slots, said opening having a dimension less than the diameter of said pins;

each of said nozzle side walls having an internally formed through slot formed therein closely adjacent yet spaced from said open-ended slot and said arcuate socket;

said internal slot serving to define a flexible wall section between said open ended slot and said arcuate socket, said flexible wall allowing said pin receiving opening to temporarily flex to a position which allows said pin to pass therethrough;

whereby said nozzle may be assembled to said means defining the air discharge opening by inserting said inlet side of said nozzle into said outlet side of said opening to thereby allow said mounting pins to pass into said slots, and, upon said pins engaging said sockets imparting sufficient force on said nozzle to cause said pins to move into said snap-fit relationship with said sockets and to allow pivotal motion of said air discharge nozzle about said longitudinal axis.

2. The apparatus of claim 1 wherein each of said nozzle side walls have a second internal slot formed therein on the other side of said open-ended slot and said arcuately shaped pin receiving socket.

3. The apparatus of claim 1 wherein one of said side walls defining said air discharge opening includes an outwardly extending tooth-like protuberance adjacent said pin on the outlet side of said opening; and wherein the wall of said air discharge nozzle adjacent said wall carrying said pin includes an arcuate tooth engaging conformation thereon adapted to releasably engage said tooth to allow movement of said air discharge nozzle upon imparting a manual rotational force thereupon and yet holding said air discharge nozzle at a desired pivotal position upon release of said manual force.

* * * * *